Figure 1:
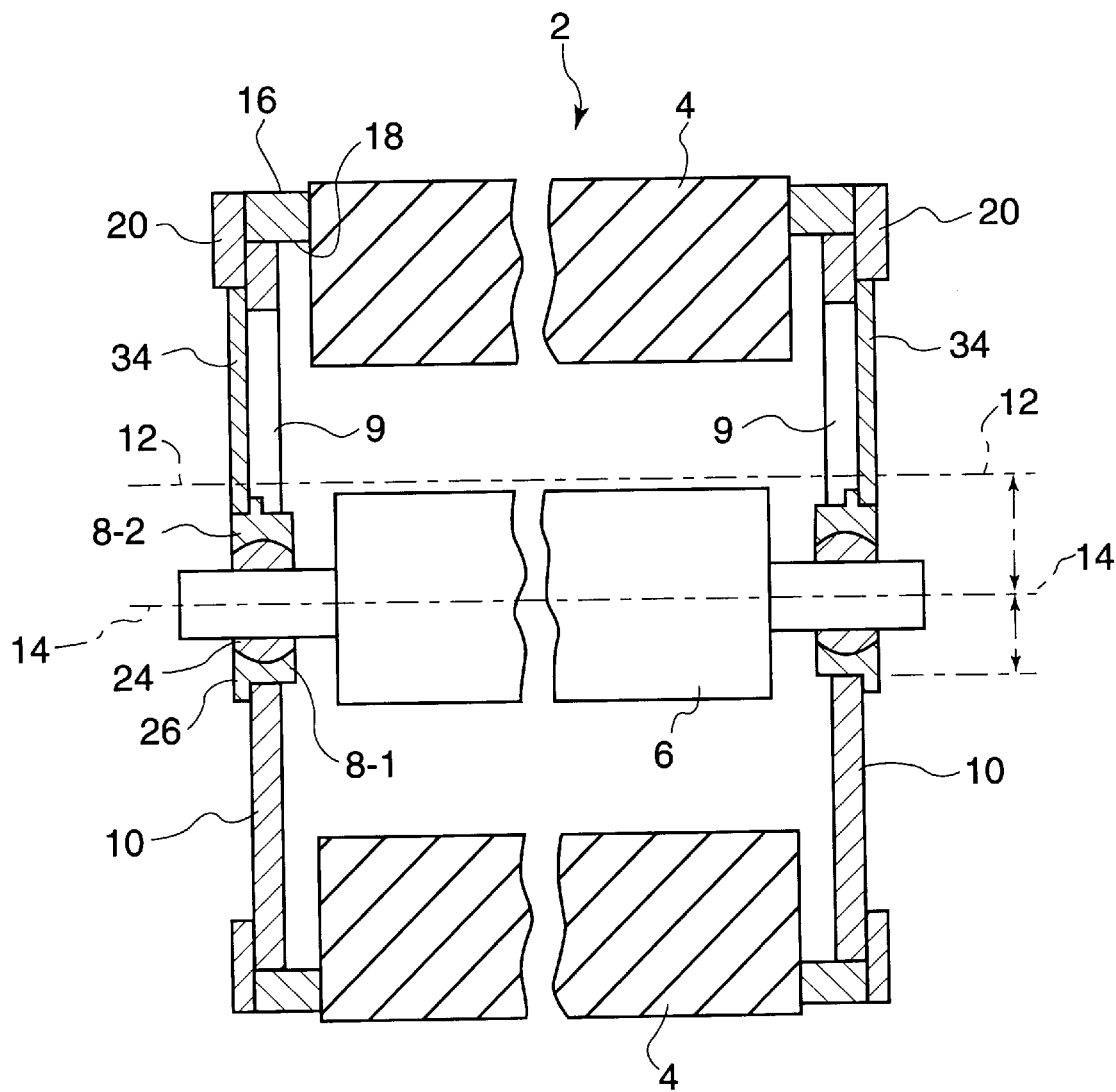

United States Patent [19]
Meyer

[11] Patent Number: 6,042,270
[45] Date of Patent: Mar. 28, 2000

[54] BEARING ARRANGEMENT

[75] Inventor: Joachim Meyer, Hannover, Germany

[73] Assignee: Renk Aktiengesellschaft, Augsburg, Germany

[21] Appl. No.: 09/045,271

[22] Filed: Mar. 20, 1998

[51] Int. Cl.[7] ............................................... F16C 23/02
[52] U.S. Cl. ........................ 384/206; 384/255; 384/263; 384/273
[58] Field of Search ................................. 384/255, 206, 384/273, 272, 263

[56] References Cited

U.S. PATENT DOCUMENTS 2,691,553  10/1954  Pettigrew .

FOREIGN PATENT DOCUMENTS

| 3 56403 | 7/1922 | Germany . |
| 10 10 334 | 4/1954 | Germany . |
| 66 00 209 | 1/1963 | Germany . |
| 27 27 264 A1 | 6/1977 | Germany . |
| 91 03 425 | 8/1991 | Germany . |
| 44 36 629 A1 | 10/1994 | Germany . |

OTHER PUBLICATIONS

Walzlager erfullen hohe Anforderungen Der Konstrukteur Oct., 1993 pp. 38, 39.

*Primary Examiner*—Lenard A. Footland
*Attorney, Agent, or Firm*—Natter & Natter

[57] ABSTRACT

Bearing arrangement for the support of a rotor (6) relative to a machine. Bearings (8) are disposed in circular openings (9) of circular disks (10) eccentrically with respect to the circular opening center (12) and is fastenable in the circular opening (9) about the circular opening center (12) in different angular positions.

16 Claims, 2 Drawing Sheets

BEARING ARRANGEMENT

Through the invention the task is to be solved of still being able, when the machine is borne on bearings, to compensate retroactively possible differences between the rotation symmetry axes of the stator and the rotor of an electric motor, for example. Further, according to the invention the convenient and simple assembly and disassembly of the upper bearing part of a bearing is to be possible, which bearing comprises an upper bearing part and a lower bearing part, which adjoin one another at an axial plane. The bearing arrangement is to require a simple construction and little material.

This task is solved according to the invention through the characterizing characteristics of claim 1.

The bearings comprise preferably a ball-and-socket bearing between a radially inner bearing part and a radially outer bearing part. Thereby the axes of rotation of the two bearings of the machine can align themselves automatically with respect to one another if the one and/or the other circular disk is rotated about its disk center.

Advantages of the invention are: rotor and stator of the machine can also be adjusted after the assembly in the bearings through eccentric adjustment of the bearings. The bearings normally comprise two parts and comprise a lower part and an upper part disposed thereon. Through the circular opening eccentric with respect to the bearing the upper bearing parts can be assembled and disassembled more readily. Thus the assembly and disassembly becomes simpler. Only a few, simple parts are required.

Further characteristics of the invention are cited in the dependent claims.

Figure 2:
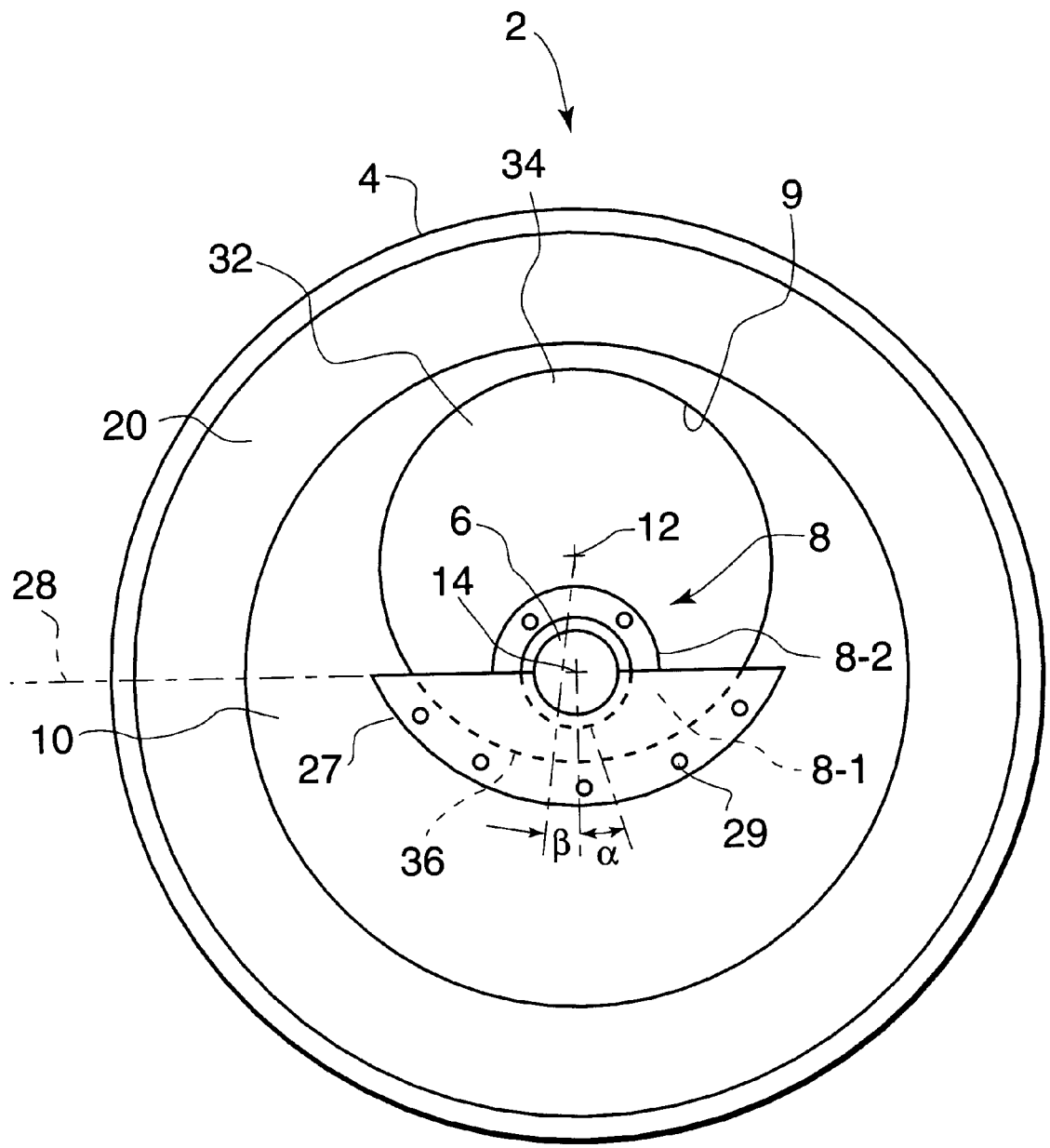

In the following the invention will be described with reference to the drawings in conjunction with a preferred embodiment as an example. In the drawing show:

FIG. 1 a schematic axial section through a bearing arrangement of a machine according to the invention, FIG. 2 a schematic front view of the bearing arrangement of FIG. 1.

FIG. 1 shows a machine e.g. an electric motor, 2 with a stator 4 and a rotor 6 extending axially through it. The rotor 6 is rotatably supported at its two ends by a bearing 8 in a circular opening 9 of a circular disk 10. A radial center 12 of the circular opening 9 is radially offset with respect to an axis of rotation 14 extending through the rotor 6 and axially through the bearing 8. The circular disk 10 is adjustable and fastenable about its radial center, in which is disposed the axis of rotation 14, relative to a machine casing or machine frame 16 to different rotational positions. See angle α in FIG. 2. For this purpose the circular disk 10 can be disposed in a circular machine opening 18 of machine frame 16 and can be fastened through a flange 20 with the machine frame 16 optionally in different rotational positions. According to other embodiments the circular disk 10 can be simultaneously implemented on its outer circumference as flange 20 and thereby replace the flange 20. In this case the circular disk 10 does not need to be disposed in a machine opening 18 of the machine frame 16.

By rotating the one and/or the other circular disk 10 of the two bearings 8 about an angle "α", the rotor 6 can be adjusted relative to the stator 4 coaxially or eccentrically with parallel or oblique center axes with respect to one another, depending on the requirement in practice.

Bearings 8 comprise preferably a ball-and-socket bearing 22 between a radially inner bearing part 24 and a radially outer bearing part 26. This ensures that the rotor 6 does not become jammed in these bearings even at relatively large radial shifting of the bearings 8.

The radial center 12 of the circular opening 9 is preferably disposed vertically above the axis of rotation 14 of the bearings 8.

Bearing 8 with is axis of rotation 14 is adjustable about the radial center 12 of the circular opening 9 to different angular positions (β) and can be fastened in the desired angular position on the circular disk 10 through fastening means, for example a flange 27 and threaded bolt 29.

Bearing 8 comprises a lower bearing part 8-1 and a upper bearing part 8-2 detachably connected with it. Their plane of separation 28 extends axially with respect to the bearing axis of rotation 14 and transversely with respect to a theoretical connection line which connects in a straight line the bearing axis of rotation 14 with the radial center 12 of the circular opening. The upper bearing part 8-2 can be mounted and dismounted readily on/from the lower bearing part 8-1 in a large opening region 32, dispersed above it, of the circular opening 9. The opening region 32 can be closed through a closure plate 34.

The lower bearing part 8-1 has a circular-arc form centering surface 36 with an arc center 12 which coincides with the radial center 12 of the circular opening 9. The arc center 12 is spaced apart from the bearing axis of rotation 14 at a radial distance which is greater than the smallest radial distance of the bearing axis of rotation (14) from the centering surface (36).

The radius of the centering surface (36) is approximated to the radius of the circular opening (9) such that together they form a matching fit.

What is claimed is:

1. A bearing arrangement for the support of a rotor relative to a stator of a machine, characterized in that in a machine plate (10) a circular opening (9) is formed, that a bearing (8) with a bearing axis of rotation (14) for supporting the rotor (6) is disposed eccentrically with respect to a radial center (12) of the circular opening (9), and that the bearing (8) with the bearing axis of rotation (14) is disposed in the circular opening (9) and is adjustable about the radial center (12) to different angular positions and can be fastened in a particular desired angular position on the machine plate (10), the bearing (8) having a periphery, only a portion of the bearing periphery having a circular arc form surface (36) mating with the circular opening (9) and engaging a surface of the circular opening (9).

2. A bearing arrangement as claimed in claim 1 wherein the circular arc form surface (36) is defined by an arc which is centered about the radial center (12) and the remaining portion of the bearing periphery is defined by an arc centered about the bearing axis of rotation (14).

3. A bearing arrangement as claimed in claim 1, characterized in that the radial center (12) is disposed above the bearing axis of rotation (14).

4. A bearing arrangement as claimed in claim 3, characterized in that the bearing (8) comprises a ball-and-socket bearing assembly (22) between a radially inner bearing part (24) and a radially outer bearing part (26), the radially outer bearing part (26) defining the bearing periphery.

5. A bearing arrangement as claimed in claim 3, characterized in that the bearing (8) comprises a lower bearing part (8-1) and an upper bearing part (8-2) removable from the lower bearing part along a plane of separation which extends axially with respect to the bearing axis of rotation (14) and transversely to a theoretical connection line, which connects in a straight line, the bearing axis of rotation (14) with the opening center (12), an area (32) of the circular opening (9) being free of obstructions to removal of the upper bearing part (8-2).

6. A bearing arrangement as claimed in claim 1 characterized in that the bearing (8) comprises a ball-and-socket bearing assembly (22) having a radially inner bearing part (24) and a radially outer bearing part (26), the radially outer bearing part (26) defining the periphery.

7. A bearing arrangement as claimed in claim 6, characterized in that the bearing (8) comprises a lower bearing part (8-1) and an upper bearing part (8-2) removable from the lower bearing part along a plane of separation which extends axially with respect to the bearing axis of rotation (14) and transversely to a theoretical connection line, which connects in a straight line the bearing axis of rotation (14) with the opening center (12), an area (32) of the circular opening (9) being free of obstructions to removal of the upper bearing part (8-2) and the machine plate (10) on a machine frame (16) or a machine casing is rotatable about the bearing axis of rotation (14) into different angular positions and can be fastened in any desired angular position on the machine frame (16) or machine casing.

8. A bearing arrangement as claimed in claim 6, characterized in that the bearing (8) comprises a lower bearing part (8-1) and an upper bearing part (8-2) removable the lower bearing part along a plane of separation which extends axially with respect to the bearing axis of rotation (14) and transversely to a theoretical connection line, which connects in a straight line the bearing axis of rotation (14) with the radial center (12), an area (32) of the circular opening (9) being free of obstructions to removal of the upper bearing part (8-2).

9. A bearing arrangement as claimed in claim 1, characterized in that the bearing (8) comprises a lower bearing part (8-1) and an upper bearing part (8-2) removable from the lower bearing part along a, plane of separation which extends axially with respect to the bearing axis of rotation (14) and transversely to a theoretical connection line, which connects in a straight line, the bearing axis of rotation (14) with the radial center (12).

10. A bearing arrangement as claimed in claim 9, characterized in that the machine plate (10) in a machine frame (16) or a machine casing is rotatable about the bearing axis of rotation (14) into different angular positions and can be fastened in any desired angular position on the machine frame (16) or machine casing.

11. A bearing arrangement as claimed in claim 1, characterized in that the machine plate (10) is provided at its outer circumference with a flange (20) for fastening on a machine frame (16).

12. A bearing arrangement as claimed in claim 1, characterized in that the machine plate (10) on a machine frame (16) or a machine casing is rotatable about the bearing axis of rotation (14) into different angular positions and can be fastened in any desired angular position on the machine frame (16) or machine casing.

13. A bearing arrangement as claimed in claim 1, characterized in that two machine plates (10) with one bearing (8) disposed in a circular opening (9) formed in each plate (10) are provided with axial spacing one from another.

14. A bearing arrangement as claimed in claim 13, characterized in that the radius of the surface (36) matches the radius of the circular opening (9) such that the circular arc form surface (36) of the bearing periphery abuts the circular opening (9).

15. A bearing arrangement as claimed in claim 13 in combination with a motor, the motor having a frame (16), a stator (4) fixed to the frame (16) and a rotor (6), one machine plate (10) being carried at one end of the frame (16), the other machine plate (10) being carried at the other end of the frame (16), a portion of the rotor being received in each bearing, whereby the axis of rotation of the rotor (6) can be adjusted relative to the stator (4) by rotation of at least one of the machine plates or by adjustment of at least one bearing relative to its circular opening (9).

16. A bearing arrangement as claimed in claim 1, characterized in that the bearing (8) has a lower bearing part (8-1) which includes the circular arc surface (36) having an arc center which is spaced apart from the bearing axis of rotation (14) a radial distance which is greater than the smallest radial distance of the bearing axis of rotation (14) from the circular arc form surface (36).

\* \* \* \* \*